(12) United States Patent
Kupczik et al.

(10) Patent No.: US 6,245,241 B1
(45) Date of Patent: *Jun. 12, 2001

(54) METHOD OF DECONTAMINATING SOILS

(75) Inventors: Günter Kupczik, Hamburg; Werner Schulze-Erfurt; Günter Luther, both of Geestach, all of (DE)

(73) Assignee: GKSS Forschungszentrum Geesthacht GmbH, Geesthacht (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,670

(22) Filed: Oct. 19, 1998

Related U.S. Application Data

(63) Continuation-in-part of application No. PCT/DE98/01132, filed on Apr. 23, 1998.

(30) Foreign Application Priority Data

Apr. 29, 1997 (DE) .............................. 197 19 034

(51) Int. Cl.[7] .................. C02F 1/72; C02F 1/78

(52) U.S. Cl. .......................... 210/759; 210/760; 210/765; 210/770

(58) Field of Search ................... 210/748, 758, 210/759, 760, 912, 765, 770

(56) References Cited

U.S. PATENT DOCUMENTS

| | | | |
|---|---|---|---|
| 4,107,790 | * 8/1978 | McCord | 366/127 |
| 4,697,751 | * 10/1987 | Chiba | 241/301 |
| 5,198,122 | * 3/1993 | Koszalka et al. | 210/748 |
| 5,376,182 | * 12/1994 | Everett et al. | 134/25.1 |

* cited by examiner

*Primary Examiner*—Chester T. Barry
(74) *Attorney, Agent, or Firm*—Klaus J. Bach

(57) ABSTRACT

In a method of decontaminating soils, sediments and mud including at least a sand fraction and a fine particle fraction which contains a particle-like silt component to which particularly contaminants comprising heavy metals and organic compounds adhere, and wherein the contaminated silt component is separated from the mineral silt component, the fine particle fraction including the contaminants is subjected essentially at the same time to a cavitation and an oxidation treatment before the contaminated silt component is separated from the mineral silt component.

10 Claims, 1 Drawing Sheet

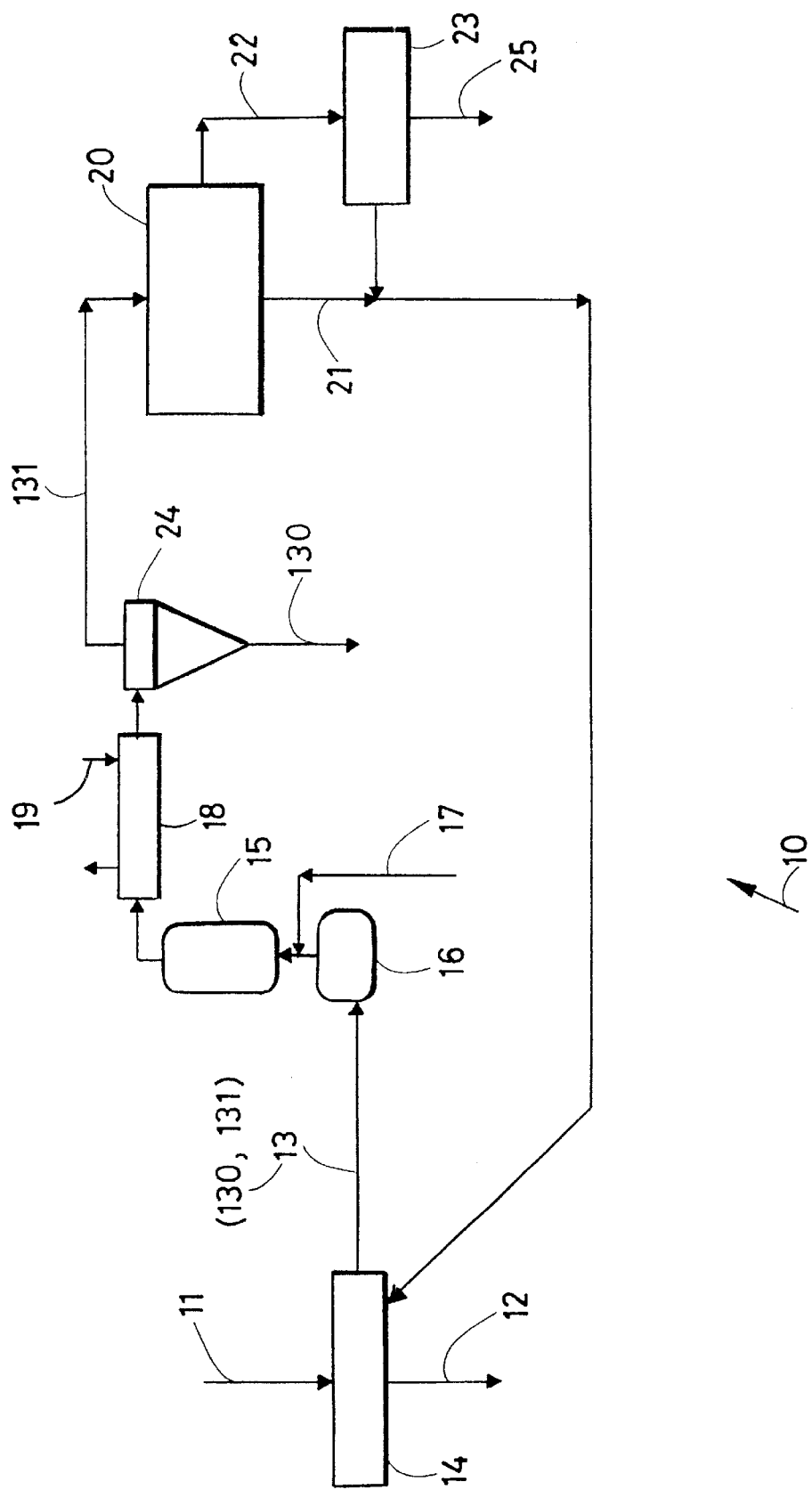

METHOD OF DECONTAMINATING SOILS

This is a continuation-in-part application of pending international patent application PCT/DE98/01132 filed Apr. 23, 1998, designating the U.S. and claiming the priority of German application 197 19 034.3 filed Apr. 23, 1997.

BACKGROUND OF THE INVENTION

The invention relates to a method of decontaminating soils such as sediments, silts and muds which include at least a sand fraction and a fine particle fraction wherein the fine particle fraction includes an organic silt component to which particularly contaminants of heavy metals and organic compounds adhere and wherein the contaminated silt fraction is to be separated from the mineral silt fraction.

Contaminated soils are present all over the world in large amounts as contaminated sediments and muds in flowing and still waters and in muds from sewage treatment plants. There are more than 200,000 suspected contaminated areas alone in Germany. Annually, in the area of the former West Germany 60,000 $m^3$ of contaminated soil are excavated and about 5,000,000 $m^3$ sewage treatment muds are generated.

These amounts cannot all be deposited. It is therefore absolutely necessary to find methods of utilizing these amounts by new environmentally acceptable methods in order to control these amounts of waste materials in an effective manner. Basically, it would first be necessary to provide economical methods by which the amounts of such contaminated materials being generated is minimized.

A second step of controlling the amount of contaminated materials would be to provide methods for decontaminating or utilizing the contaminated soils remaining after the first control step. But if there is no economical way of utilizing the remaining contaminated materials those materials must be deposited. However, today's deposits are tomorrows contaminations.

Contaminated soils, sediments and muds have been separated in the past by simple hydraulic procedures into sand and fine particle fractions (<63 $\mu$m). The fine particle fraction comprises a mineral silt fraction (2 $\mu$m to ≦63 $\mu$m) and a clay fraction (<2 $\mu$m), and organic contaminants such as heavy metals or heavy metal compounds. The sand fraction is essentially free of contaminations and can generally be utilized otherwise. Since, inspite of many attempts and proposals, economical decontamination processes of contaminated soils do not exist the contaminated silt fractions are generally deposited as waste.

Contaminated silts are included for example in oil-containing anthropogen-affected soils, in sediments and muds of flowing and standing waters (excavation materials) and in industrial wastes, commercial wastes and domestic wastes.

During examination of contaminated river sediments, it was found that the contaminants are concentrated essentially in the fine particle fractions. Many of the known decontamination processes as mentioned above are not suitable if the silt fraction in the soil to be decontaminated is greater than a certain limit such as 30%. It has to be taken into consideration that for example the linear distribution coefficients between sediment and the surrounding water for hexachlorobenzine (HCB) is for example between 2000 and 3000. The distribution coefficient between the carbon fraction in the sediment and the water is even higher that is about 50,000. Hexachlorobenzine consequently has, like almost all organic contaminants, a high affinity to sediments and an extremely high affinity to the carbon fraction attached thereto. Tests for the heavy metal area show that also most of the heavy metals present are preferably associated with the organic fraction.

It has been known so far to oxidize only polycyclic aromatic hydrocarbons contained in synthetic oil-water emulsions utilizing a spray reactor for an oxidative disintegration. However, the disadvantage of such an oxidation medium, such as ozone is that it requires very long oxidation times and a very expensive and large equipment. It has also been tried to remove chlorinated solvents from water by evaporation in a cavitation area, that is, a chemical compound conversion under cavitation conditions. However, subjecting a mixture or a suspension to cavitation has only limited effects since the efficiency of the conversion or, respectively, the release of the contaminants contained therein is limited and, on the way to a subsequent separation apparatus, the component to be separated from the mixture or the suspension may be readsorbed by the fine particles which are contained therein and from which they had just been separated.

It is consequently the object of the present invention to provide a method of decontaminating soils by which mineral fractions of soils, sediments, silts and muds can be effectively separated so that, at the end of the method according to the invention, the remaining volume which cannot be utilized is so small that it is essentially negligible or that it can be easily converted chemically for neutralization while the largest fraction can be utilized without incurring environmental problems. The method should also require only relatively inexpensive equipment and it should be possible to perform the method in a simple and inexpensive way.

SUMMARY OF THE INVENTION

In a method of decontaminating soils, sediments and mud including at least a sand fraction and a fine particle fraction which contains a particle-like silt component to which particularly contaminants comprising heavy metals and organic compounds adhere, and wherein the contaminated silt component is separated from the mineral silt component, the fine particle fraction including the contaminants is subjected essentially at the same time to a cavitation and an oxidation treatment before the contaminated silt component is separated from the mineral silt component.

The method according to the invention effectively utilizes a combination of the cavitation and oxidation procedures. It can easily be integrated into known soil or sediment decontamination plants as a pretreatment step. If fine particle decontamination plants are in existence the method according to the invention can be utilized as a follow-up decontamination procedure for the conversion of contaminants to compounds which can be biologically destroyed.

Accordingly the method according to the invention cannot only be used in connection with newly designed plants, but the method according to the invention can also be used in connection with existing plants whereby existing plants become highly effective for the separation of the material and can produce end products which, on one hand, can immediately be reused, for example, in construction or the manufacture of cement and, on the other hand, the organic compounds generated in the process are very pure and can also be utilized or they can easily be subjected to a chemical conversion, for example, a combustion as a final conversion. During this final conversion of energy in the form of combustion energy may be generated. The rest of non-convertible organic and/or heavy metal components which cannot be further converted is so small that the need for deposition volume is greatly reduced.

Basically, it is possible to generate the cavitative effects on the silt material by means of any suitable energy source. Tests have shown that the implosion of the steam bubbles caused by the cavitation releases substantial energies in the carrier fluid which can provide for the desired clean up of the surfaces of the particle-like silt fraction.

Also, the oxidation treatment of the silt fraction may be achieved in any suitable manner. It has been found to be advantageous to provide for the oxidation by the use of hydrogen peroxide or, preferably, by the addition of ozone. Ozone and hydrogen-peroxide are, as is well known, strong oxidants, whereby the readsorption of the cavitatively pretreated silt by the oxidant is prevented. Pretreatment by oxidation occurred, for example, by hydrogen peroxide-enriched water.

But oxidation can also be achieved simply by the addition of oxygen which is supplied in the form of an oxygen-enriched medium.

Finally, it is possible to admix to the silt fraction a surfactant and/or at least one bio oil during the cavitative or oxidation treatment, that is in the same method step in which the cavitative and the oxidation treatments of the silt fraction occur. The addition of biologically decomposable oils or surfactants changes the solution equilibrium toward the water or respectively, toward organic. In this way, the silt fraction can be separated in a simpler and more effective manner.

In accordance with another embodiment of the invention, the silt fraction is supplied, after the cavitative and oxidation treatment, to a reactor for heat treatment. The residence time of the silt fraction in the reactor and/or the reaction temperature in the reactor are preferably controllable so that, by means of the silt fraction in the reactor as follow-up clean up step, the process can be adapted to the respective silt mixture or, respectively, the composition of the silt fraction in an optimal manner.

After the cavitative and oxidation treatment and after passing through an intermediate reactor, if present, the silt fraction can be supplied to a first separation apparatus, for example, a cyclone in which it is separated into a decontaminated mineral silt fraction and a silt fraction enriched with heavy metals and/or organic compounds.

It is finally advantageous if, after the cavitative and oxidation treatment, the silt fraction is supplied to a second separation apparatus wherein the aqueous phase of the silt fraction which is depleted of organic compounds is removed whereas the phase enriched with organic compounds is supplied to an extraction apparatus, that is, a concentration apparatus from which the concentrated organic phase is conducted for example to a combustion apparatus. The heat generated thereby can be utilized in the overall process. Also, the enriched organic fraction may be so decomposed that the components can otherwise be utilized. The water produced during the enriching process in the extraction process is returned as fresh water to the primary soil cleaning process in which the contaminated soil, the sediments, the silt and the mud are separated into a clean sand fraction and the contaminated silt fraction which, according to the method of the invention is decontaminated and separated.

Below, the invention will be described in greater detail with reference to the drawings.

BRIEF DESCRIPTION OF THE DRAWINGS

The sole FIGURE shows, in a block diagram, the method for decontaminating contaminated soils sediments, silts and muds.

DESCRIPTION OF A PREFERRED EMBODIMENT

With the arrangement 10 as shown in the FIGURE contaminated soils sediments, muds and silts, which will simply be called soils 11, can be decontaminated. The soils 11 are a mixture including at least a sand fraction 12 and a fine particle fraction 13. The fine particle fraction 13 includes a particle-like organic silt fraction 131 to which particularly contaminants of heavy metals and organic compounds adhere and a mineral silt fraction 130. The contaminated silt fraction 131 is to be separated from the mineral silt fraction 130.

For this purpose, the soils 11 are first washed in a conventional soil washing apparatus 14. The soil leaves the soil washing apparatus 14 in the form of a cleaned sand fraction 12 and a contaminated silt fraction or fine particle fraction 13 which comprises a mixture of a mineral silt fraction 130 and a silt fraction 131 which is enriched with heavy metals and/or heavy metal compounds and/or organic compounds. The fine particle fraction or respectively, contaminated silt fraction 13, includes water so that it can be pumped by means of a pump 16 to a cavitation apparatus 15. Within a tube portion of about 30 cm length which is not specifically shown, cavitation is generated by pressure reduction in the silt fraction which is conducted to the cavitation apparatus 15. At the same time, an oxidant is added by an oxidant supply arrangement 17 in a dosed manner. As oxidant, ozone enriched water can be admixed to the fine particle fraction 13 to be separated which is supplied to the cavitation apparatus 15 by means of the pump 16. But it is also possible that the fine particle fraction 13 is mixed with an ozone-enriched water flow before it enters the cavitation apparatus 15.

But oxygen or hydrogen peroxide may also be added as oxidants. It is furthermore possible to admix biologically decomposable oils and/or surfactants to the fine particle fraction 13 in the cavitation apparatus during the oxidation and cavitation treatment.

In the cavitation apparatus 15, the organic components attached to the surface of the mineral particles are fully or partially dislodged from the surfaces of the mineral particles by the implosion of the cavitation bubbles. Chemical conversions occur easily in the high energy cavitation zone and the admixed oxidant oxidizes hydrocarbon compounds whereby the affinity to the surrounding water and consequently, their solubility is increased.

By the oxidation and the chemical cracking processes initiated by the cavitation, the transfer of the contaminants into the water phase is facilitated that is their affinity to the mineral part of the silt fraction is reduced. The fine particle fraction 13 leaving the cavitation apparatus is consequently preconditioned such that the separation of the contaminants by subsequent separation processes is facilitated.

First, the pretreated fine particle fraction 13 is supplied to a reactor 18, for example a tube reactor, in which, by the addition of energy 19, the fine particle fraction is heated to an controllable temperature for a controllable residence time in the reactor 18 whereby the subsequent separation of the contaminants is even more facilitated. The fine particle fraction which has been heat-treated is then supplied to a first separation apparatus 24, for example, in the form of a cyclone, in which water, hydrocarbons, and clay containing particles, that is, generally the silt fraction 131 enriched with heavy metals and/or heavy metal compounds and/or organic compounds is separated and leaves the cyclone whereas the decontaminated mineral silt portion 130 leaves the cyclone at the bottom. The decontaminated silt fraction 130 can then be further processed.

The silt fraction 131 which is enriched with heavy metals and/or heavy metal compounds and/or organic compounds is then supplied to a second separating apparatus 20, for example, a water treatment apparatus. The aqueous phase 21 leaving the separating apparatus 20, which phase is depleted of organic and/or heavy metal compounds is reused as circulating water and is returned to the soil washing apparatus 14, whereas the phase 22 which is enriched with organic and/or heavy metal compounds is supplied to an extraction apparatus 23 (concentrator). The fraction 25 leaving the extraction apparatus which is enriched with organic compounds can be subjected for example to combustion and the heat generated thereby can be supplied for example to the reactor 18 as process heat. Depending on the composition of the organically enriched fraction, it may also be possible to separate and utilize the components.

The water leaving the extraction apparatus 23 may also be used in the process and may be recirculated as clean water to the soil washing apparatus 14. It is generally also possible to subject the fine particle fraction 13 which leaves the cavitation apparatus 15 first to a flotation process and/or an extraction process (not shown) which may be in addition or alternatively to the first and second separation apparatus 24, 20. Finally, it is also possible to clean the waste water leaving the second separation apparatus 20 by ultrafiltration and/or flotation (not shown) before it is reused as wash water in the soil washing apparatus 14.

What is claimed is:

1. A method of decontaminating soils, sediments and muds including at least a sand fraction and a fine particle fraction which contains a particle-like silt component to which contaminants comprising heavy metals and organic compounds adhere, and wherein the contaminated silt component is to be separated from the mineral silt component, said method comprising the steps of:

providing an aqueous slurry of said contaminated soil, separating said soil into fractions including said mineral silt fractions, a contaminated silt fraction carrying the contaminants and a sand fraction which is free of contaminants and fine particles and discharging said sand fraction, supplying said fine particle fractions to a pump for pressurizing said fine particle fractions, conducting said pressurized fine particle fractions through a pressure reduction tube, in which the pressure of said fine particle fraction is suddenly reduced so as to cause cavitation in said fine particle fraction, whereby part of said contaminants are released from said contaminated silt fraction, supplying oxidation means to said cavitated fine particle fraction for oxidizing said released contaminants to prevent their recombination with the fine particles, separating the clean silt fraction from the slurry including the contaminated silt fraction and the clean silt fraction, supplying the slurry with remaining contaminated silt fraction to a separating apparatus in which the aqueous phase is removed from said slurry and discharging the remaining contaminated silt fraction for disposal or further treatment.

2. A method according to claim 1, wherein said means for oxidizing said released contaminants is hydrogen peroxide which is added to said contaminated silt component while said fine particle fraction is subjected to cavitation.

3. A method according to claim 1, wherein said means for oxidizing said released contaminants is ozone which is added to said contaminated silt component while said fine particle fraction is subjected to cavitation.

4. A method according to claim 1, wherein said means for oxidizing said released contaminants is oxygen which is added to said contaminated silt component while said fine particle fraction is subjected to cavitation.

5. A method according to claim 4, wherein said oxygen is added in the form of an oxygen-enriched medium while said fine particle fraction is subjected to cavitation.

6. A method according to claim 1, wherein, during said cavitation and oxidation treatment, at least one of a surfactant and a biologically decomposable oil is added to the contaminated silt component.

7. A method according to claim 1, wherein, after being subjected to the cavitation and oxidation treatment, said contaminated silt component is supplied to a reactor for heat treatment.

8. A method according to claim 7, wherein said contaminated silt component is heated to a controllable temperature and retained for a controllable residence time in said heat treatment reactor.

9. A method according to claim 1, wherein said aqueous phase which is removed from said slurry is returned to said soil for producing said aqueous slurry of said contaminated soil.

10. A method according to claim 1, wherein said remaining contaminated silt fraction is supplied to a concentrator for reducing the volume of the remaining contaminated silt fraction.

* * * * *